Nov. 4, 1930.　　　　　D. MARTIN　　　　　1,780,201
PROCESS AND MECHANISM FOR MAKING METAL PELLETS
Filed Aug. 13, 1928

Inventor
David Martin
By Frank M. Dough
His Attorney

Patented Nov. 4, 1930

1,780,201

UNITED STATES PATENT OFFICE

DAVID MARTIN, OF MANSFIELD, OHIO, ASSIGNOR TO THE GLOBE STEEL ABRASIVE COMPANY, OF MANSFIELD, OHIO, A CORPORATION OF OHIO

PROCESS AND MECHANISM FOR MAKING METAL PELLETS

Application filed August 13, 1928. Serial No. 299,146.

My invention relates to processes and mechanisms for making metal pellets, and relates particularly to such a process and mechanism as is adapted to continuously form from molten iron, iron pellets substantially all of which are formed in sizes between predetermined minimum and maximum sizes.

In the preparation of metal grit for abrasive purposes, ordinarily the grit is prepared by comminuting pellets formed from molten iron, and which pellets vary widely in size. It is found that when the pellets are below a predetermined size, that these cannot be efficiently comminuted in the preparation of metallic grit and that by all prior processes of preparing the pellets, such as by blowing a jet of steam, or air, against descending streams of molten metal, and permitting the blown particles to fall in cooling water, that at least one-fourth of the metal tonnage so operated upon is found to be in the form of metallic particles too small in size to be efficiently granulated or comminuted, and therefore one-fourth of the ordinary tonnage of iron melted is lost for the purposes intended.

This results in a very large loss in the manufacture of granulated metallic grit, and I therefore aim by the present invention to increase the efficiency of the manufacturing processes ultimately resulting in the production of granulated metallic grit, by materially increasing the percentage of molten material which takes the intermediate form of pellets of sufficient size to be entirely granulated.

Another object of my invention is to provide metallic pellets for use in the preparation of metallic grit, the pellets to be of relatively uniform size.

Another object of my invention is to provide pellets for the manufacture of metallic grit, from molten iron, by an improved process which will substantially eliminate loss or waste otherwise caused by preparation of a fractional part of the iron in the form of pellets or grains too small to be efficiently granulated, and which have surfaces too regular to be used in the place of granulated particles of larger pellets.

Another object of my invention is to provide improved mechanisms by the operation of which the aforesaid objects may be accomplished.

Other objects of my invention and the invention itself will become apparent by reference to the following description of an embodiment mechanism operated according to my improved process, and which mechanism and the process is illustrated in the accompanying drawings.

Referring to the drawings.

Figure 1:
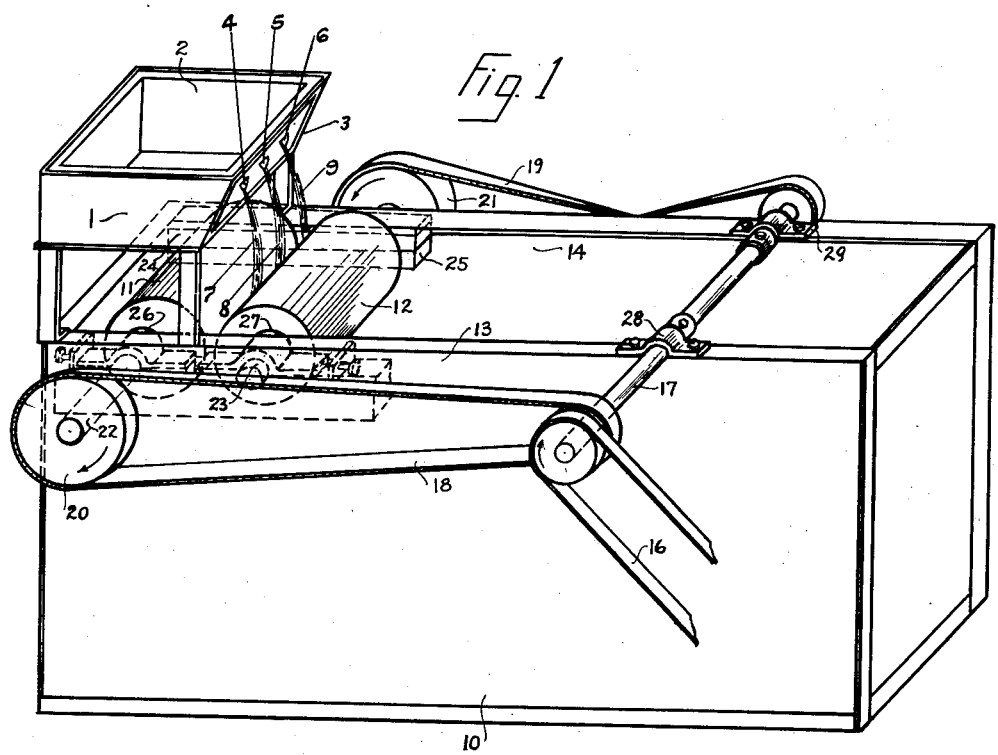
Fig. 1 illustrates a mechanism, in isometric view, embodying the principles of my invention.
Figure 2:
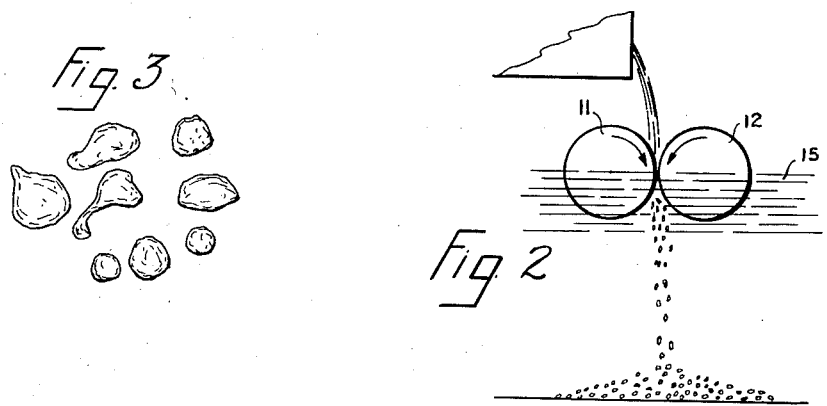
Fig. 2 illustrates diagrammatically, the process involved in the operation of the mechanism of Fig. 1.

Referring now first to Figs. 1 and 2, at 1 I show a receptacle adapted to receive molten cast iron or the like poured therein from a crucible, or cupola, while in a readily fluent molten condition.

The receptacle has a fire-clay lining 2, and a vent plate 3, preferably of heat-resistant metallic material, the vent plate 3 being provided with a plurality of apertures 4, 5, and 6 disposed each at the same level, and each comprising a pair of laterally converging sides meeting at the bottom of the openings, which are preferably, as shown, triangular in form. The molten metal is introduced into the receptacle 1 at a rate just sufficient to maintain the level of molten metal therein above the converging bottom edges of the apertures, so that the streams 7, 8 and 9 of molten metal, issue from the receptacle through the apertures or vents, continuously, and the flow of metal in the streams will be at a substantially constant rate.

At 11 and 12 I provide a pair of metallic rolls mounted transversely on the side walls 13 and 14 of a tank 10, which contains water in an amount sufficient to submerge the lower parts of the rolls.

In Fig. 2, the level of the surface of the water is shown at 15 as being up to the level of the axes of the rolls. This is the preferable arrangement. The rolls 11 and 12 may be driven as by a primary driving belt 16 driving a counter-shaft 17, which in turn, by belts 18 and 19, drives pulleys 20 and 21 affixed to the ends of the roll shafts 22 and 23 respectively.

Suitable pairs of bearings such as those shown at 24—25, 26—27, and 28—29, are provided for the shafts carrying the rolls 11 and 12, and the counter shaft 17, respectively.

The rolls are disposed with their opposing adjacent surfaces parallel and are preferably cylindrical in form, and the adjacent opposing surfaces are preferably spaced about $\frac{1}{16}$ of an inch apart and are preferably normally bridged by the water in the tank which is supplied continuously to keep the water level up to the axes of the rolls.

The rolls are rotated in opposite directions so that their upper adjacent surfaces are continuously approaching, as indicated by the arrows in the drawings.

The receptacle 1 is preferably disposed substantially above and with its venting apertures 4, 5 and 6 disposed slightly to one side of a vertical projection of the space between the rolls. The height of the vents between such space, and the lateral displacement thereof, being such, consideration being had to the rate of flow of molten metal issuing from the vents, that the descending streams of molten metal issuing therefrom, will engage the rolls exactly midway between their axes. In other words, the streams are so directed that they will substantially impact with the rolls at their nearest adjacent surfaces, and the rolls rotated will carry the molten downwardly therebetween, at the same time exposing the metal to the chilling and breaking-up effects of water which is carried peripherally of the rolls as they rotate and which piles up slightly above the nearest adjacent surfaces of the rolls, between the rolls.

Figure 3:
Fig. 3 illustrates eight different pellets, varying somewhat in form, which have been produced in the mechanism of and operated according to the process of my invention.

The molten metal, therefore, descending in streams, passes through the piled up water strata, just engaging the rolls, and then engages the rolls midway therebetween. The streams, therefore, tend to spread out laterally into thin sheets, but being red hot and molten, and exposed to the effects of the water and steam, there is a breaking-up of these sheets, practically as they are formed, into smaller separated particles, which descend from the rolls in the bed of water and coalesce into pellets of more or less somewhat irregular spherical form, substantially as illustrated in Fig. 3.

Generally, the action of the rolls is to tend to form the molten streams into the form of ribbon, but the breaking-up action tends to reform the ribbons as flattened disks, which by the cohesive force acting upon the particles while still in the fluid state, change the disks of more or less regular outline into pellets.

This is accomplished without producing any substantial amount of metallic "bubbles", that is thin-shelled hollow balls, such, as I find are produced where the streams are permitted to descend directly on a transverse surface of a roll or plate in the presence of water. Many of these thin-shelled metallic "bubbles" are useless for the preparation of metallic grit and, therefore, incidental preparation of such hollow pellets is nearly as objectionable as the preparation of the very small pellets or "shot" incidental to the older processes previously mentioned.

The pellets descending to the bottom of the tank may then be removed therefrom in any suitable way, as by emptying the tank at intervals, or continuously by a conveyor in any of the well known ways, the latter arrangement being preferred, since the entire process is then made continuous, without the necessity of interposed intervals during which collecting of the pellets is accomplished.

Having thus described my invention in a specific embodiment, I am aware that variations from the embodiment process and mechanism, herein described, may be had without departing from the spirit of my invention.

I claim:

1. In the manufacture of metallic grit, the process of preparing pellets to be later comminuted, comprising the introduction of streams of molten iron between closely related opposing parallel surfaces of rotating rolls in the presence of a cooling liquid carried peripherally on the rolls and therebetween, flattening the streams between the rolls and breaking up the flattened molten iron by the combined effects of molecular cohesion of the metal and the conversion into steam of portions of the water in engagement with the flattened surfaces.

2. The process of preparing metallic pellets of sizes in a given range of sizes, comprising the flattening of a downwardly falling stream of molten metal to ribbon thickness, and breaking-up of the molten metal ribbon by the combined effects of metallic molecular cohesion and the expansive action of water taking the form of steam, substantially simultaneously.

3. In a mechanism for forming metallic pellets of sizes within a predetermined range of sizes, a pair of rolls, means to rotate at least one of the rolls with the upper portion of its surface most adjacent the other roll moving downwardly to the position of nearest approach to the nearest adjacent portion of the other roll, the rolls being so disposed that their nearest adjacent surface portions are disposed closely together and in substantial parallel relative position, means for directing a stream of molten metal from above the rolls to fall into the space between the said parallel surfaces and to engage therewith, said surfaces being disposed so close together as to spread the molten metal stream into ribbon thickness, means effective to apply a film of water to the surfaces of the rolls to cool the rolls and to provide, by conversion into steam, an explosive effect tending to break up the flattened streams into particles, and a water containing receptacle adapted to receive the particles from the rolls, and having a bottom wall spaced substantially therefrom.

4. In the manufacture of metallic grit, the process of preparing pellets to be later comminuted which includes introducing molten iron between a pair of closely spaced rolls, rotating the rolls to flatten the molten iron into a sheet or ribbon, bringing water into contact with the surface of the ribbon and breaking up the ribbon into pieces by the explosive action of converting the water into steam by the heat of the ribbon.

5. In the manufacture of metallic grit, the process of preparing pellets to be later comminuted which includes introducing a stream of molten iron between two rotating closely spaced rolls to flatten the stream into a ribbon or sheet, supplying a cooling liquid to the rolls to be carried on their rolling surfaces and to be brought into contact with the ribbon or sheet of molten metal by the rolling movement of the rolls.

6. The process of preparing metallic pellets to be comminuted into metallic grit which includes supplying a cooling fluid to the surface of a roller and supplying concurrently therewith a stream of molten metal to the roller to be flattened thereby into a ribbon or sheet of molten metal and breaking up the sheet or ribbon into pieces by the explosive action of the water being converted into steam by the heat of the ribbon.

7. In a mechanism for forming metallic pellets, a roller for rolling molten metal into a sheet or ribbon, means for supplying molten metal to the roll to be rolled thereby, means for supplying a cooling fluid to the said ribbon or sheet substantially at that portion where it is rolled thinnest by the roller.

8. In a mechanism for forming metallic pellets of sizes within a predetermined range of sizes, a pair of rolls, means to rotate at least one of the rolls, means for directing a stream of molten metal from above the rolls to fall into the space between the rolls and into engagement therewith and be rolled thereby into a ribbon or sheet of molten metal, means for supplying a film of water to the surface of at least one of the rolls to cool the roll and to provide, by conversion of the water into steam by the heat of the molten metal, an explosive effect breaking up the flattened sheet or ribbon into particles.

In testimony whereof I hereunto affix my signature this first day of August, 1928.

DAVID MARTIN.